July 30, 1963 S. A. COGSDILL 3,099,174
COUNTERSINKING TOOL
Filed June 29, 1960 2 Sheets-Sheet 1
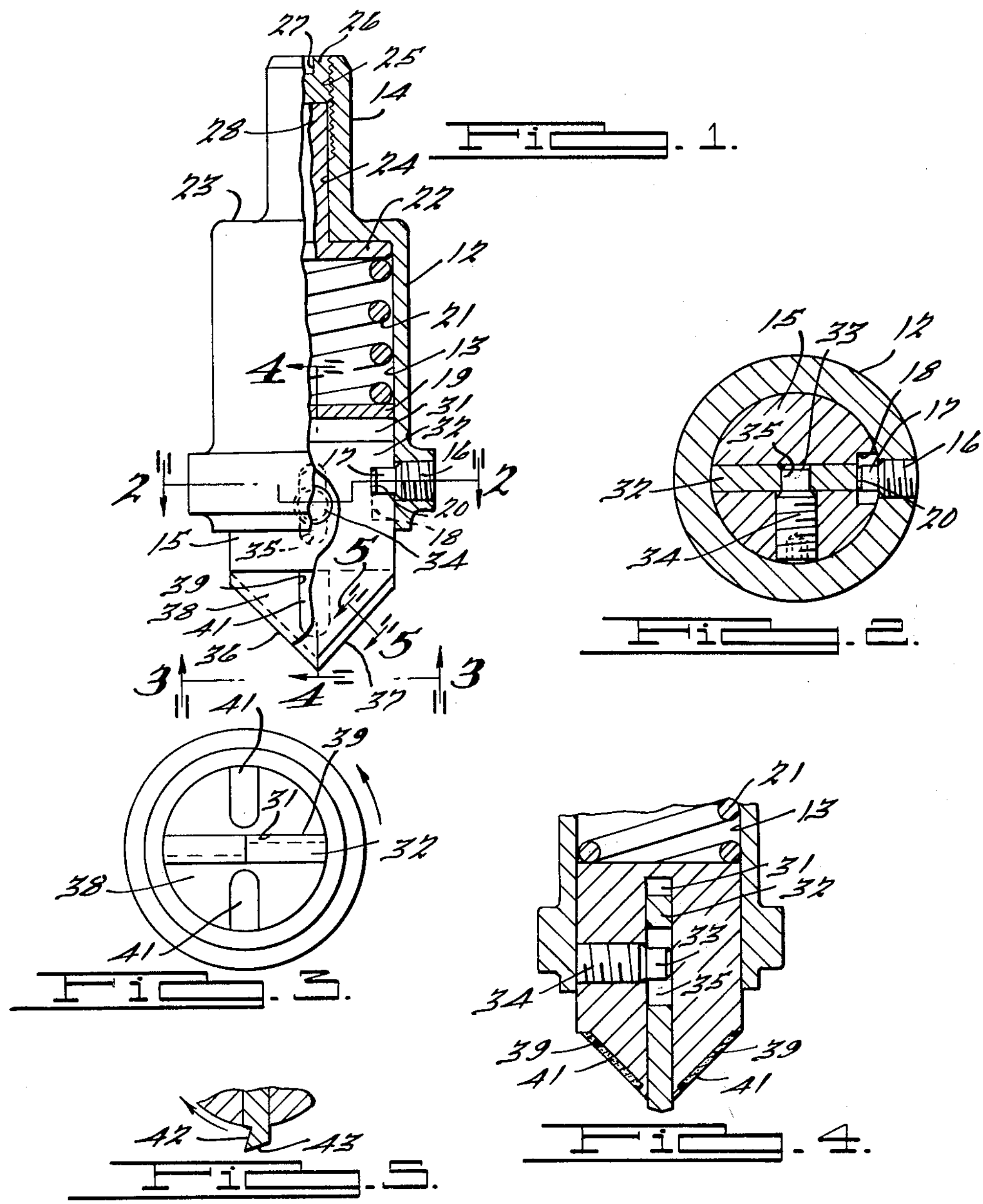
INVENTOR.
Stuart A. Cogsdill
BY
Harness, Dickey + Pierce.
ATTORNEYS July 30, 1963 S. A. COGSDILL 3,099,174
COUNTERSINKING TOOL
Filed June 29, 1960 2 Sheets-Sheet 2
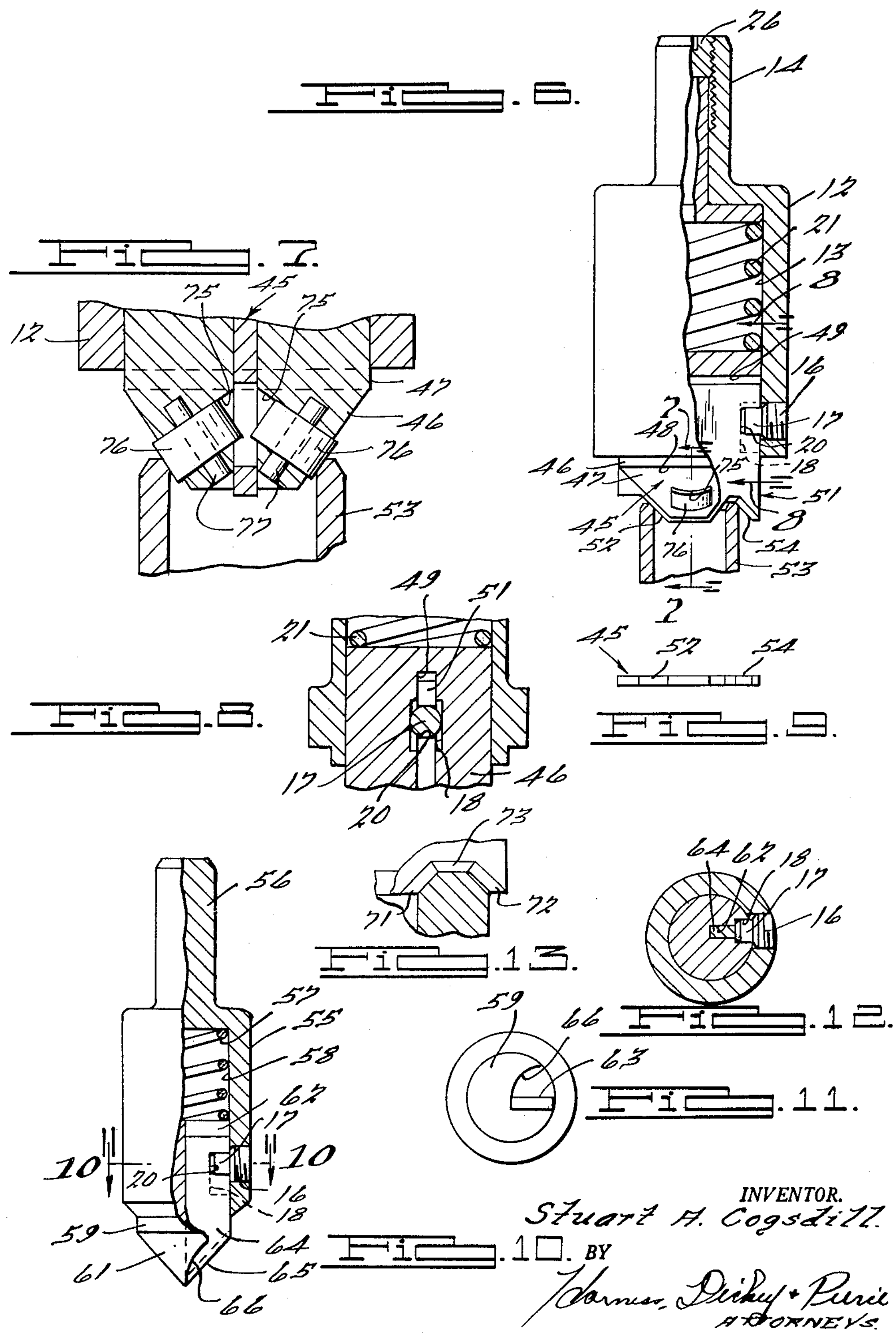
INVENTOR.
Stuart A. Cogsdill
BY
Harness, Dickey & Pierce
ATTORNEYS.

United States Patent Office 3,099,174

Patented July 30, 1963

3,099,174

COUNTERSINKING TOOL

Stuart A. Cogsdill, Orchard Lake, Mich., assignor to Cogsdill Tool Products, Inc., Oak Park, Mich., a corporation of Michigan Filed June 29, 1960, Ser. No. 39,557
12 Claims. (Cl. 77—73.5)

This invention relates to cutting tools, and particularly to a tool having a retractable blade carried in a head providing a rest which steadies the blade during the cutting operation.

The present tool embodies a housing having a shank end by which the housing is supported, driven in rotation and longitudinally advanced. A retractable head is supported within the housing made of a hard material, such as tool steel, carbide and the like. The head contains a slot in which a blade is supported in a manner to extend in cutting position from the end of the head which is of semispherical, conical or other shape capable of engaging the work to steady and back up the cutting edge of the blade. A coil spring is mounted within the housing between the shank end and the head for urging the head outwardly of the housing. A setscrew has an end projecting within a slot in the body of the head to limit the movement of the body within the housing and its projection from the end thereof. The body of the head has a setscrew threaded therein, with an end extending through a slot in the blade, permitting relative movement between the blade and the head.

The shank of the housing is hollow and contains an internal thread near the outer end in which a threaded plug is adjustably mounted. The plug moves a pin against a disk adjacent the end of the housing against which one end of the spring bears for the purpose of compressing the spring and thereby increasing the load on the head. The engaging end of the head is hard, being made of tool steel, or a carbide end may be applied to a tool steel body, or the engaging end of the head may have recesses therein containing inserts of carbide or other hard material which will engage the workpiece and back up the tool to prevent chatter and provide assurance that a smooth cutting operation will be performed.

Accordingly, the main objects of the invention are: to provide a cutting tool with a retractable blade within a retractable head which provides support for the cutting edge of the blade; to retain a head within a housing for limited outward movement when urged by a spring into engagement with a workpiece which is machined by a blade contained within a slot in the head; to provide a head for a cutting tool with a slot for supporting a retractable blade and with a conical end adjacent to the cutting edge of the blade constructed of carbide or similar hard substance, and, in general, to provide a cutting edge of a blade with a hard backing and supporting head within a tool which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken end view of a tool with parts in section, embodying features of the present invention;

FIG. 2 is a sectional view of the structure illustrated in FIG. 1, taken on the line 2—2 thereof;

FIG. 3 is an end view of the tool illustrated in FIG. 1, as viewed from the cutting end thereof;

FIG. 4 is a broken sectional view of the structure illustrated in FIG. 1, taken along the line 4—4 thereof;

FIG. 5 is a broken sectional view of the structure illustrated in FIG. 1, taken along the line 5—5 thereof;

FIG. 6 is a view of a tool, similar to that illustrated in FIG. 1, showing another form thereof;

FIG. 7 is a sectional view of the structure illustrated in FIG. 6, taken along the line 7—7 thereof;

FIG. 8 is a broken sectional view of the structure illustrated in FIG. 6, taken along the line 8—8 thereof;

FIG. 9 is a view of the cutting end of the tool illustrated in FIG. 6;

FIG. 10 is a view of structure, similar to that illustrated in FIG. 1, showing a further form which the invention may assume;

FIG. 11 is a sectional view of the structure illustrated in FIG. 10, taken along the line 11—11 thereof;

FIG. 12 is an end view of the structure illustrated in FIG. 10, as viewed from the cutting end thereof, and FIGURE 13 is a broken view of the cutting portion of a blade which is similar to that illustrated on the tool of FIG. 6.

Referring to FIGS. 1 to 5, a tool of the present invention is illustrated embodying a housing 12 having a hollow interior 13 and a shank 14 on the closed end by which the tool is supported and driven. A cylindrical head 15 extends within the hollow interior 13 of the housing 12 and is retained therein by a setscrew 16 having a finger 17 extending into a slot 18 in the side of the body portion 19 of the head. A coil spring 21 is disposed within the interior 13, having one end abutting against the top of the body 19, and the other end abutting against a washer 22 which engages the internal surface of the end wall 23 of the housing. The shank 14 is hollow, having an aperture 24 extending therethrough, at least the upper portion of which contains an internal thread 25. A plug 26 is screwed into the end of the aperture 24 on the threads 25, having a countersunk hexagonal aperture 27 for the reception of an Allen wrench by which the head may be adjusted. The plug 26 may have an extending pin thereon, or a separate pin 28 may abut the disk 22 and move it away from the end wall 23 to stress the spring 21 and thereby regulate the pressure necessary to retract the head 15 within the interior 13 of the housing.

The head 15 contains a slot 31 in which a blade 32 is disposed and ıetained for limited movement by a finger 33 on a setscrew 34 which extends within a slot 35 in the central portion of the blade. The blade has a notch 30 therein into which the end 17 of the setscrew 16 extends for securing the blade to the housing 12 against movement relative thereto. The extending end of the blade has cutting edges 36 and 37 thereon which are in angular relation to each other, the angle following the shape of a conical end portion 38 provided on the body portion 19 of the head 15. The head 15 and the conical end 38 are preferably made of a hard material, such as that known in the trade as "tool steel" for backing up the blade and preventing any substantial wear and chatter. In the form of head 15 illustrated in FIGS. 1 to 5, a pair of recesses 39, diametrically disposed on the conical end 38, is provided for receiving the insert 41 made of carbide, tool steel or other hard material which is sweated or otherwise secured in position in the recesses. As illustrated in FIG. 3, the hard polished surfaces of the hard material of the inserts 41 are disposed 90° from the cutting edges 36 and 37 of the blades formed by the rake angle 42 and the clearance angle 43, the surfaces of which are less than 90° apart. The cutting edges 36 and 37 are disposed to cut in the direction of rotation of the tool, for example, in a counterclockwise direction in FIG. 3, as indicated by the arrow. The arbor of a drill press could support the shank 14 of the tool for rotation while being mounted to advance the tool axially in the conventional manner. The cutting edges 36 and 37 of the blade 32 could be employed for chamfering the internal edge of a ring, sleeve, pipe or the like.

Normally the spring 21 urges the head 15 downwardly to have the conical end 38 disposed beyond the cutting edges 36 and 37 of the blade 32. The conical end portion 38 of the head retracts into the housing 12 against the bias of the spring 21 after the hard inserts 41 engage the edge of a sleeve to be machined as the cutting edges are uncovered to perform the machining operation by cutting into the material to be removed. Any cuttings or chips which are severed by the cutting edges will be broken up and disposed of ahead of the blade as the blade is advanced. A direct cutting pressure is applied to the blade 32 by the housing 12 and shank 14 while the conical end 38 engaging both sides of the blade steadies it and prevents chatter. The pressure on the head 15 and conical end 38 is adjusted by the plug 26 to an amount to provide adequate support for the blade.

In FIGS. 6 to 9, a similar form of cutting tool is illustrated, that wherein the housing 12 is the same as that illustrated in FIGS. 1 to 5. The head 45 has a body portion 46 made of hard material and a conical end 47 made of a material harder than the material of the body portion 46, such material being carbide, tool steel or the like. The conical end 47 is sweated or otherwise secured to the body portion 46 along the line 48 in the conventional manner. The body 46 and the conical end portion 47 have a slot 49 extending therein for receiving a cutting blade 51. The blade may be provided with a sloping cutting edge 52 for chamfering the inner edge of a sleeve 53 so as to have the surface slope inwardly and downwardly. The opposite side of the blade has a cutting notch 54 formed therein for producing an outward and downward chamfer and a dressed top edge at the time the inner edge is chamfered. By having the entire conical end 47 made of carbide, tool steel or similar extremely hard material, wear is substantially eliminated even though the force of the advancing and rotating tool is taken thereby on the inner edge of the sleeve 53. The blade 51 has a notch 20 therein aligned with the slot 18 in the body portion 46 of the head 45 and is maintained in position by the projection of the finger 17 which snugly fits the notch to secure the blade to the housing for advancement therewith. If the body portion 46 is made of relatively soft material, such as that of the head 45, diametrically disposed recesses 75 may be provided equidistant from each end of the slot 49 and extending thereinto, as illustrated in FIG. 7. A roller 76 is disposed in each recess 75 for rotation on a shaft 77. The inner ends of the rollers extend into a slot 78 in the center of the blade 51 which is of sufficient length to permit the blade to be adjusted the required distance. The rollers further reduce the friction between the head 45 and the work surface beyond that provided by the inserts 41 above described or a head made of solid carbide. Otherwise, the tool illustrated in FIGS. 6 to 9 is exactly the same as that illustrated and described with regard to FIGS. 1 to 5.

In FIGS. 10, 11 and 12 a further form of the invention is illustrated, that wherein a housing 55 has a solid shank 56 on the driving end with a spring 57 in the hollow interior 58 of the housing. A head 59 is made of hard material, such as tool steel, carbide or the like, being cylindrical in shape with a conical portion 61 on the projecting end. A slot 62 in the wall of the head 59 extends inwardly from one side, with one face 63 disposed upon a diameter across the head. A blade 64 is mounted in the slot 62 having a notch 20 therein aligned with a slot 18 in the head 59 in which a finger 17 extends which is provided on the end of the setscrew 16. The notch 20 snugly receives the finger 17 while the slot 18 is elongated permitting the head 59 to move relatively to the blade and housing. A relieved cutting edge 65 is formed on the lower end of the blade at the same angle as the conical end portion 61 and is rectractable to expose the cutting edge to the work. The blade 64 is fixed to the housing 55 which advances it into engagement with the work as the head 59 rests upon the work and is urged thereagainst by the pressure of the spring 57 which may or may not be adjustable.

The cutting edge 65 may have rake and relief angles provided thereon, as hereinabove described, and the conical end portion 61 may have a cutout portion 66 to provide chip clearance and a chip breaking area adjacent to the cutting edge. The chip clearance area is desirable when the blade 64 is of the same length as the slot 62 and is engaged by the spring 57 to have the cutting edge 65 urged beyond the surface of the conical portion 61 to where it may cut more rapidly and thereby produce larger chips which are broken in the clearance area 66. When the blade becomes shorter due to the sharpening thereof, the housing must advance farther and the head 55 must retract a greater amount to perform a cutting operation with the blade steadied by the engagement of the conical end 61 with the end of the sleeve being chamfered.

In FIG. 13 a further form of blade is illustrated which has a notched cutting edge which machines the top and the edges as one end of a sleeve. The notched cutting edge may be applied to both sides of the blade 51 of the tool illustrated in FIG. 6 or to a half blade for the tool illustrated in FIG. 10. The blade 69 has sloping side cutting edges 71 and 72 joined in the center by the top cutting edge 73. The blade is secured to the housing by the finger 17 and the head having the conical end is retractable against the tension of a spring to expose the cutting edge of the blade when the housing is advanced to perform a machining operation on the end of a sleeve.

What is claimed is:

1. In a blade for a cutting tool, a thin flat sheet metal body of rectangular shape, and a cutting edge on one end of the blade formed by a relieved sloping side forming a short and a long side to the blade body, said blade having a finger receiving notch in the body inwardly of the edge of the short side above said cutting edge.

2. A tool having a housing containing a hollow interior and a driving shank, a head within said housing, a spring within said housing for urging said head outwardly of said housing, means for limiting the movement of the head within said housing and its projection therefrom, said head having a slot, a blade within said slot having a cutting edge on the outer end, means for securing said blade to said housing, the projecting end of said head being of conical shape having recesses in the outer face thereof, inserts of a material harder than that of the head secured in said recesses, and rollers in said recesses for engaging the work.

3. A tool having a housing containing a hollow interior and a driving shank, a head within said housing, a spring within said housing for urging said head outwardly of said housing, means for limiting the movement of the head within said housing and its projection therefrom, said head having a slot, a blade within said slot having a cutting edge on the outer end, means for securing said blade to said housing, the projecting end of said head being of conical shape having recesses in the outer face thereof, inserts of a material harder than that of the head secured in said recesses, and rollers in said recesses for engaging the work, said rollers extending into the slot for the blade and said blade having a slot for receiving said rollers.

4. A tool having a housing containing a hollow interior and a driving shank, a head within said housing having an aperture in the side thereof, a spring within said housing for urging said head outwardly thereof, finger means on said housing extending within said aperture and so related as to permit limited movement of the head therein, said head containing a slot, and a blade within said slot having a notch which snugly fits said finger and secures the blade to the housing.

5. A tool having a housing containing a hollow interior and a driving shank, a head within said housing having an aperture in the side thereof, a spring within said housing for urging said head outwardly thereof, finger means on said housing extending within said aperture and so related as to permit limited movement of the head therein, said head containing a slot, and a blade within said slot having a notch which snugly fits said finger and secures the blade to the housing, the projecting end of said head being of conical shape having an angle of slope substantially equal to that of the cutting edge, at least said conical end being made of wear-resistant material.

6. A tool having a housing containing a hollow interior and a driving shank, a head within said housing having an aperture in the side thereof, a spring within said housing for urging said head outwardly thereof, finger means on said housing extending within said aperture and so related as to permit limited movement of the head therein, said head containing a slot, a blade within said slot having a notch which snugly fits said finger and secures the blade to the housing, the projecting end of said head being of conical shape having recesses in the outer face thereof, and inserts of a material harder than that of the head secured in said recesses.

7. A tool having a housing containing a hollow interior and a driving shank, a head within said housing having an aperture in the side thereof, a spring within said housing for urging said head outwardly thereof, finger means on said housing extending within said aperture and so related as to permit limited movement of the head therein, said head containing a slot, a blade within said slot having a notch which snugly fits said finger and secures the blade to the housing, said shank being hollow and containing an internal thread, a threaded plug adjustable on the thread within said shank, and means movable by the plug for adjusting the compression of said spring and the pressure on said head.

8. A tool having a housing containing a hollow interior and a driving shank, a head within said housing having an aperture in the side thereof, a spring within said housing for urging said head outwardly thereof, finger means on said housing extending within said aperture and so related as to permit limited movement of the head therein, said head containing a slot, and a blade within said slot having a notch which snugly fits said finger and secures the blade to the housing, said head having an area cut away adjacent to said slot to provide a chip clearance and breaking recess adjacent to the cutting edge.

9. A tool having a housing containing a hollow interior and a driving shank, a head within said housing having an aperture in the side thereof, a spring within said housing for urging said head outwardly thereof, finger means on said housing extending within said aperture and so related as to permit limited movement of the head therein, said head containing a slot, a blade within said slot having a notch which snugly fits said finger and secures the blade to the housing, and cutting edges on said blade for cutting on the inside, outside and top of an end of a cylindrical sleeve being machined.

10. A tool having a housing containing a hollow interior and a driving shank, a head within said housing having an aperture in the side thereof, a spring within said housing for urging said head outwardly thereof, finger means on said housing extending within said aperture and so related as to permit limited movement of the head therein, said head containing a slot, a blade within said slot having a notch which snugly fits said finger and secures the blade to the housing, the projecting end of said head being of conical shape having recesses disposed therein, and rollers in said recesses for engaging the work.

11. A tool having a housing containing a hollow interior and a driving shank, a head within said housing having an aperture in the side thereof, a spring within said housing for urging said head outwardly thereof, finger means on said housing extending within said aperture and so related as to permit limited movement of the head therein, said head containing a slot, a blade within said slot having a notch which snugly fits said finger and secures the blade to the housing, the projecting end of said head being of conical shape having recesses disposed therein, and rollers in said recesses for engaging the work, said rollers being of sufficient diameter to extend into a slot in the central part of the blade.

12. In a unit blade for cutting the edge of an aperture, a body portion made from sheet material having two parallel side edges, a top end and a bottom end, said bottom end having two edges sloping from a non-cutting center at an angle to the parallel side edges and being relieved to form cutting edges outwardly from said center, one side edge of said blade having a finger receiving notch extending thereinto from one edge thereof above said cutting edges.

References Cited in the file of this patent

UNITED STATES PATENTS

| | | |
|---|---|---|
| 748,890 | Taylor et al. | Jan. 5, 1904 |
| 1,923,177 | Tucker | Aug. 22, 1933 |
| 2,026,471 | Hoelzel | Dec. 31, 1935 |
| 2,694,321 | Riza | Nov. 16, 1954 |
| 2,703,996 | Reynolds et al. | Mar. 15, 1955 |